Sept. 12, 1967    D. B. COX    3,340,976
SPEED RESPONSIVE COUPLING DEVICES
Filed Dec. 6, 1965    2 Sheets-Sheet 1

INVENTOR.
DAVID B. COX
BY *A. H. Caser*
ATTORNEY

Sept. 12, 1967  D. B. COX  3,340,976
SPEED RESPONSIVE COUPLING DEVICES
Filed Dec. 6, 1965  2 Sheets-Sheet 2
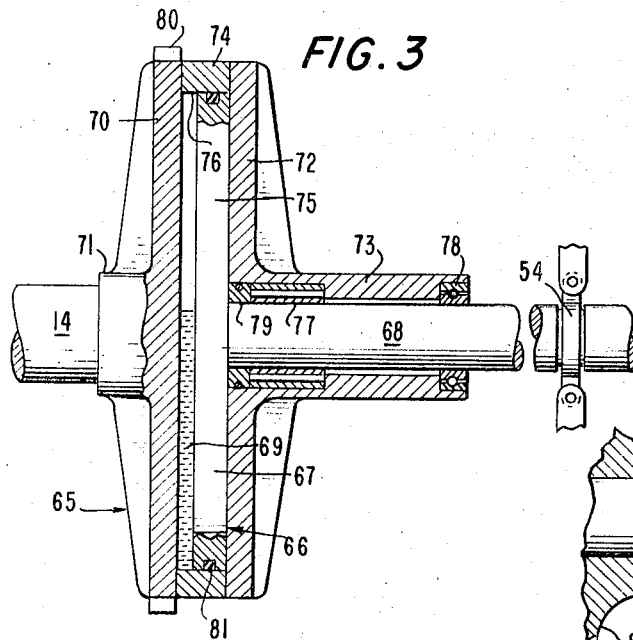
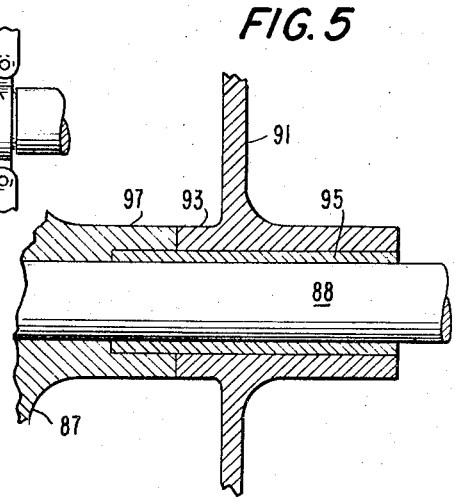
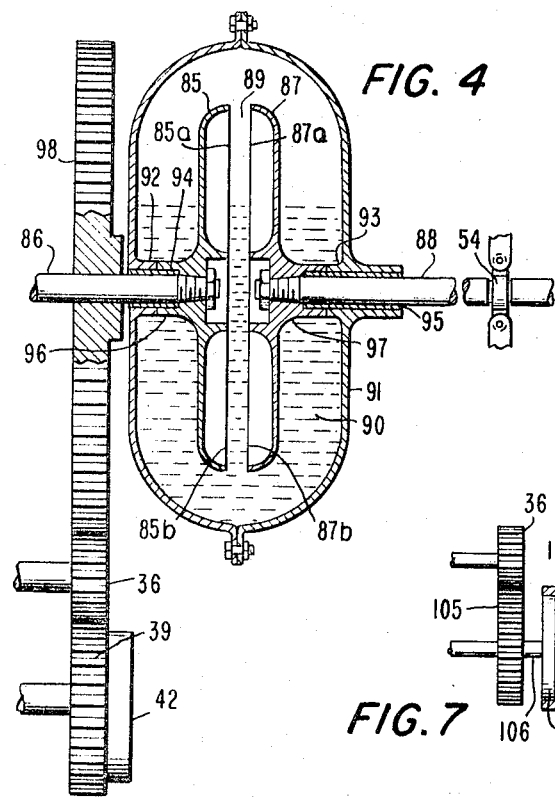
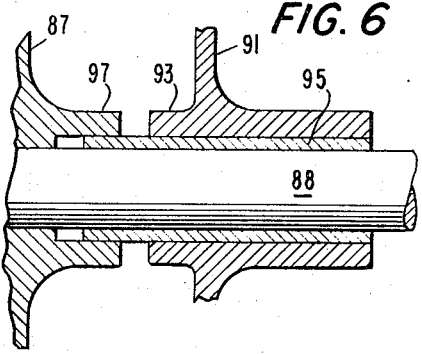
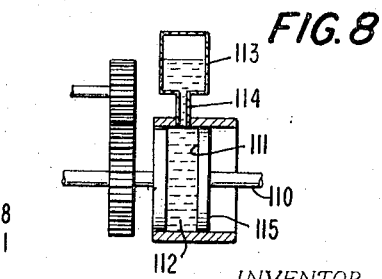
INVENTOR.
DAVID B. COX
BY A. H. Caser
ATTORNEY United States Patent Office 3,340,976
Patented Sept. 12, 1967

3,340,976
SPEED RESPONSIVE COUPLING DEVICES
David B. Cox, Sewell, N.J., assignor to Mobil Oil
Corporation, a corporation of New York
Filed Dec. 6, 1965, Ser. No. 511,746
10 Claims. (Cl. 192—103)

This invention relates to a power transmitting device, such as a clutch or coupling, and particularly to a device which, at some time after start up of the driving member, automatically effects a driving engagement with the driven member.

The invention is of particular utility for coupling a driving or torque-producing unit whose developed torque is low at low speed. An example of such a unit is an AC motor, and as applied thereto, the invention provides for coupling the motor with a driven element only after the motor has picked up speed, so that the starting current load on the motor is reduced. Thus, the invention permits simple motors to be used without need of starting gear and other auxiliaries and it reduces heat build-up in the motor.

According to the invention, the coupling action is controlled by means of a non-Newtonian viscoelastic liquid which need not be physically present in the main power coupling area. Such a liquid, when subjected to a shearing stress, undergoes shear and produces a normal force or pressure which effects coupling between the driving and the driven members. In particular, the rotational motion of the driving member serves to apply a rotary shearing stress to the liquid, thus inducing rotary shear therein and producing the normal force or pressure. The geometric direction or orientation of the normal force with respect to the liquid and surrounding environment will become clear from the ensuing description of the device in which the liquid is employed.

Essentially, the invention relates to a power transmission device having a driving member, a driven member axially movable toward and from the driving member, and means intermediate said members for providing a driving connection therebetween. Adjacent the driving member, and driven by it, is a rotatable plate which rotates with the driving member. A non-rotatable plate is disposed coaxially of and substantially parallel to the rotatable plate, being spaced therefrom by a narrow gap, and is axially movable toward and from the same. Filling the gap is the non-Newtonian viscoelastic liquid which produces the described force normal to the adjacent surface of the non-rotatable plate. The rotatable plate, by its rotation, applies a rotary stress to the liquid, causing it to undergo rotary shear and to produce said normal force, and the latter acts against the non-rotatable plate to move the same axially away from the rotatable plate. By suitable means, which may be hydraulic, electrical, pneumatic, mechanical, etc., the last-mentioned axial movement is applied to the driven member to move the same towards said driving member, thereby bringing the said members into driving engagement. As described and shown herein, the last-mentioned means are suitably mechanical means.

The invention may be better understood by referring to the accompanying drawings, wherein—

FIGS. 3 and 4 are diagrammatic views of fluid coupling members which may be employed in FIG. 1 in place of the clutch shown there;

FIG. 5 is an enlarged fragmental view of a detail of FIG. 4;

FIG. 6 is a view like FIG. 5 but with the parts in a different position;

FIG. 7 is a fragmental view of a detail of FIG. 1 but showing a modification; and FIG. 8 is a view like FIG. 7 but showing another modification.

Figure 1:
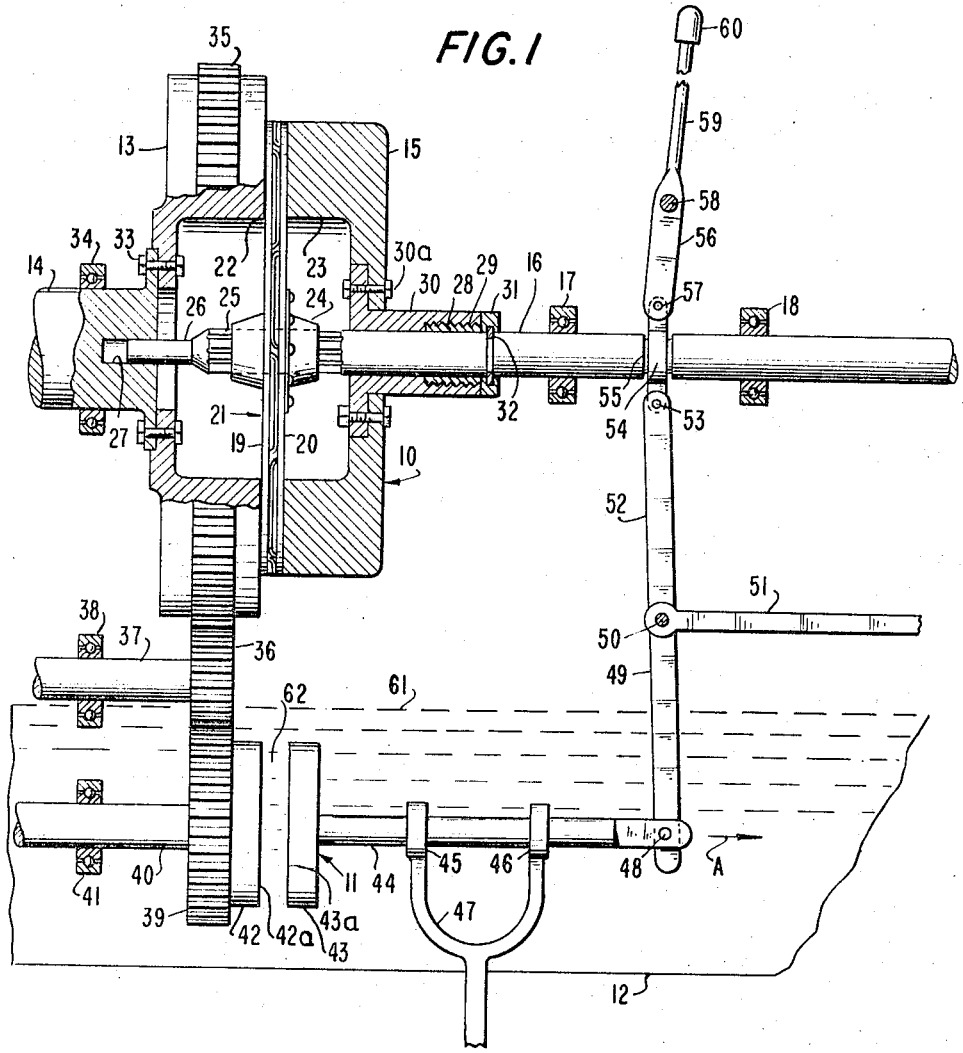
FIG. 1 is a more or less diagrammatic view, partly in section and with parts broken away, of a friction clutch which controls its own engagement by means of the non-Newtonian viscoelastic liquid.

Referring to FIG. 1, a clutch, generally designated 10, is shown together with the control means provided by the invention, generally designated 11. Clutch 10 comprises a driving member 13 connected to a driving shaft 14 which is rotated by a power source not shown. Opposite member 13 is the driven member 15, shown with its attached shaft 16 supported by bearings 17 and 18. Clutch faces 19, 20 of a conventional single plate friction type clutch 21 are engageable with the annular engaging portions 22, 23 of members 13 and 15 for providing a frictional driving engagement therebetween. Integral with clutch 21 is a hub 24 which is mounted on shaft 16, as by the splined connection 25, for rotation therewith. The inner end portion of shaft 16 is reduced, as at 26, and is supported in recess 27 of drive shaft 14. A sleeve 28 is press-fitted on shaft 16 and is externally threaded at 29 to secure the collar portion 30 of member 15. The latter is fastened to collar 30 as by bolts 30a. An annular ring 31, keyed to shaft 16 at 32, prevents axial movement of member 15 to the right, as seen in FIG. 1.

Driving member 13 is connected to the driving shaft 14 as by bolts 33, and the shaft is supported on bearing 34. On its outer circumferential surface the member 13 has gear teeth 35 which engage a gear 36 carried by shaft 37 supported on bearing 38, and the latter gear engages a gear 39 on shaft 40 which is supported on bearing 41. Fixed to one side of gear 39 is a plate 42, and spaced therefrom by a narrow gap is another plate 43. The latter is fixed to shaft 44 which is slideably mounted on a pair of bearings 45, 46 carried by a stationary support 47. Preferably the plates 42, 43, or the opposed faces 42a, 43a thereof, are flat or near flat, circular, substantially parallel, and coaxially disposed relatively to each other. Plate 42 is rotatable, as indicated, and is not axially movable, while plate 43 is not rotatable but movable axially with respect to plate 42. Shaft 44 is pivoted at 48 to a lever 49 which in turn is pivoted at 50 on a support 51. Lever 49 has an upper portion 52 which is pivoted at 53 to the lower portion of a collar 54 disposed in groove 55 cut in the output shaft 16. A lever 56 is pivotally connected to the upper portion of the collar at 57 and is itself pivoted at 58. Lever 56 has an upper portion 59 which terminates in a suitable actuating portion such as the handle 60.

A non-Newtonian viscoelastic liquid 61 is present in the container or housing 12 to a depth sufficient to immerse the plates 42, 43, and particularly the narrow gap 62 between them.

Figure 2:
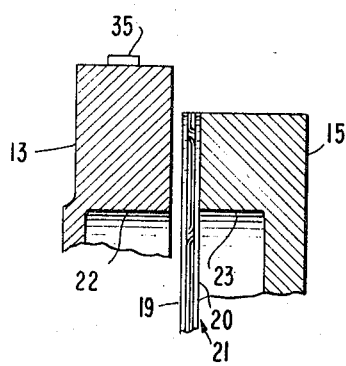
FIG. 2 is a diagrammatic fragmental view of a detail of FIG. 1, showing the clutch parts in a different position.

Considering the clutch 10 to be disengaged, i.e., with the clutch face 19 separated from the portion 22, as shown in FIG. 2, rotation of shaft 14 drives member 13 and the gears 36 and 39, thus rotating the plate 42. The latter action imparts rotary stress to the liquid in gap 62, and as noted, the liquid undergoes rotary shear, producing a force or pressure normal to the opposed surfaces of the plates. The direction of the force, with respect to plates 42 and 43, is toward both plates, i.e., the force produced expresses itself as a force which tries to move the plates apart; however, as only plate 43 is axially movable, the net effect is that the pressure acts against plate 43. Considering the normal force effect in more detail, it may also be noted that the normal force occurs along the common axis of rotation of the plates (assuming they were mounted on a common axis), and that normal forces also are distributed radially from the center of each plate to the periphery. The force is greatest along the common axis and decreases steadily as one moves toward the periphery. At the periphery the normal forces are about zero. To summarize the foregoing, the normal forces are normal to the opposed radial surfaces of the plates; the forces occur along the axis of rotation of the plates and are radially distributed from such axis to the periphery; and the force or pressure is greatest along the axis of rotation and zero at the periphery. It will be understood that references to normal force or normal pressure have the foregoing significance.

To return to the operation of FIG. 1, the normal force or pressure acting on plate 43 is great enough to move it and its shaft 44 a substantial distance, ranging from a fraction of an inch to one, two, or more inches, in the direction of arrow A. It will be seen that such movement has the effect of moving the lower portion of lever 49 to the right and the upper portion 52 of the lever to the left, with the result that collar 54 is moved to the left together with the lower portion of lever 56. In consequence, shaft 16 moves to the left so that member 15 presses the clutch 21 against member 13, thus establishing a driving engagement between the said members. This driving engagement is maintained so long as plate 42 is rotated to create the normal pressure in the liquid disposed in the gap 62.

When shaft 14 stops rotating, the described gear train and plate 42 also stop, no normal pressure is then generated in the liquid, and there is no force urging shaft 16 and member 15 to the left in FIG. 1. Consequently clutch 21 is not held in driving engagement with member 13, and the member 15 is not driven through the clutch.

Lever 56 may be used to fully open the clutch when the input shaft 14 is stationary, as by moving the handle 60 to the left.

In FIG. 3 a fluid coupling is shown which may be substituted for the friction clutch 10 of FIG. 1. The coupling comprises a driving member 65, to which an input shaft 14 is connected, a driven member 66 comprising a plate 67 having the shaft 68 fixedly secured thereto, and between the two members a fluid power transmitting agent 69, such as a viscous oil, through which power is transferred by viscous drag.

Driving member 65 actually comprises a rotatable liquid-tight housing disposed about the driven member and formed of a disc 70, in the hub 71 of which the shaft 14 is supported and fixedly secured by means not shown, a disc 72 spaced from disc 70 having an elongated hub 73, and an annular ring 74 between the two discs at the periphery thereof and fastened by means not shown.

Driven member 66 comprises a disc 75, disposed in the space 76 between discs 70 and 72, having output shaft 68 fixed thereto for rotation therewith. Shaft 68 extends through hub 73 and is supported therein by bearings 77 and 78. An oil seal is shown at 79. The space 76 between discs 70 and 75 is partially filled with the oil 69.

Rotation of member 65 drives member 66 through the viscous drag of the oil, provided the discs 70 and 67 are close enough together to permit the effect of viscous drag to become operative. As shown in FIG. 3, discs 70 and 67 are too far apart, or are to be understood as being too far apart, to permit viscous drag to be operative, and consequently the coupling does not transmit power. But as member 65 rotates, the gear teeth 80 on its outer periphery engage the gear 36, which then engages gear 39, note FIG. 1, thereby setting in motion the train of events, already described, which culminate in the movement of shaft 68 to the left as seen in FIG. 3, under the action of collar 54. Such movement brings disc 67 closer to disc 70, distributing the liquid 69 to a greater extent throughout the space 76, and when the discs are close enough for the phenomenon of viscous drag to occur, the disc 67 rotates, thus rotating the output shaft 68.

It should be understood that the amount of liquid 69 in space 76 is variable and may be chosen for a desired operation. A seal 81 is provided in the edge of plate 67 to help keep the liquid on the left hand side of the plate as seen in FIG. 3.

It will be understood that the linkage described in FIG. 1, comprising shaft 44, lever 49, support 51, and collar 54, is dimensioned and arranged to move shaft 68 to the left a desired amount for the transfer of power by the coupling.

In FIG. 4 another fluid coupling is shown which may be used in place of the friction clutch 10 of FIG. 1. The driving member comprises the vaned disc or impeller 85, which is secured to the rotatable input shaft 86, and the driven member comprises the vaned disc 87 secured to the rotatable output shaft 88. Vanes are shown at 85a, 85b, 87a and 87b, and it will be understood that each disc has a plurality of vanes. The discs are spaced by a gap 89, and as seen in FIG. 4, the width of this gap is to be understood as too large for effective transfer of motion from disc 85 to disc 87. Both discs are immersed for about three-fourths of their diameter in a power transmitting fluid 90 contained in the stationary housing 91. The fluid may be a light mineral oil or other suitable liquid. The housing is journalled at 92 and 93 for reception of press-fitted bearing sleeves 94 and 95 in which shafts 86 and 88 are supported. It will be seen that the sleeves 94, 95 extend into hubs 96, 97 on the discs. Shafts 86, 88 have tapered end portions and are threaded in the said hubs and fastened thereto by nuts, as shown. Hub 96 rotates on sleeve 94, while hub 97 rotates on sleeve 95 and is slidable therealong.

Mounted on shaft 86 by means not shown and rotatable therewith is a gear 98 which engages gear 36, and which in turn drives gear 39 having the plate 42 attached thereto. These last structures are the same as those described in FIG. 1, and it will be understood that the resulting action, and the necessary structures therefor, are also substantially the same, culminating in the axial movement, under the urging of collar 54, of shaft 88 and disc 87 toward the disc 85. Thus, when disc 87 is sufficiently close to disc 85, rotation of the latter will move the liquid 90 by means of the vanes, and this motion is imparted to the vaned disc 87 and the shaft 88. In FIG. 5 the position of disc 87 relatively to housing 91 is the same as in FIG. 4 but the parts are enlarged. FIG. 6 shows the relative position of the parts after operation of the normal force effect; thus, shaft 88 and disc 87 have moved to the left a sufficient distance to bring the discs into driving engagement.

When input shaft 86 is stationary, there is of course no transfer of power by the coupling.

In FIG. 7 a modification is illustrated, applicable to all the preceding views, which comprises a restriction of the amount of viscoelastic liquid to that shown at 100 in the liquid-tight chamber or gap 101 between plates 102 and 103. The plates are fitted in an open-ended cylinder 104 which helps form the liquid-tight chamber 101. Plate 102 is rotated by gear 105 and shaft 106, to which it is fixedly secured, and gear 105 is driven by gear 36, which is described in the preceding views. Plate 103 and its shaft 107 are non-rotatable but axially movable, the plate sliding along the internal surfaces 108 of the cylinder, which will be lubricated by the liquid. Shaft 106 may be omitted if plate 102 is made as an extension of gear 105, in the way that plate 42 is an extension of gear 39, note FIG. 1. The arrangement shown in FIG. 7 may be of use where only a limited axial movement of shaft 107 is desired.

In FIG. 8, a restricted amount of liquid is also employed, although greater than in FIG. 7, and the net result is to secure greater axial movement of the shaft 110 for transmitting motion to the clutch or coupling. Here, the chamber or gap 111 containing liquid 112 is supplied by a reservoir 113 of liquid through pipe 114, so that as plate 115 is moved to the right, additional liquid will enter chamber 111 from the reservoir. It may be noted that by moving plate 115 to the left, the width of chamber 111 may be adjusted as desired. If also desired, a valve may be placed in line 114. The remaining construction of FIG. 8 is the same as in FIG. 7 and need not be described further.

Referring generally to the various views, it is to be understood that the friction clutch of FIG. 1 and the fluid couplings of FIGS. 3 and 4 are merely illustrative and may be substituted by other suitable units for accomplishing the same purposes. The gear 36 is also merely illustrative and may be omitted, leaving the gear 39 to be driven by the gear teeth 35 or 80 on the driving member or by the gear 98. The direction of rotation of gear 39 is not material. The area of the power transmitting surfaces 42a and 43a of plates 42 and 43 is variable; a useful range of the area of one of the surfaces is 20 to 125 sq. in., which is to be considered as illustrative rather than limiting. Plates 42 and 43 preferably have power transmitting surfaces of substantially the same area. The amount of axial movement of plate 43 is variable but generally need not be more than a few inches and may be as little as a fraction of an inch. The transfer of this movement to the driven shaft may be controlled as desired by a suitable choice of the connecting linkage.

Turning now to the liquid employed in the gap 62, or chambers 101 or 111, it is described as non-Newtonian, viscoelastic, capable of exerting a normal force, and as viscous. A non-Newtonian liquid is one in which the ratio of shearing stress to the rate of shear is not constant; if this ratio were constant, it would define the absolute viscosity, and the liquid would be a Newtonian one; but as the ratio is not constant, the liquid is said to be non-Newtonian, and the ratio defines its apparent viscosity at the particular shear rate.

A viscoelastic liquid is one which exhibits both viscous and elastic behavior; thus it has flow properties of a liquid and elastic properties of a solid.

Besides being non-Newtonian and viscoelastic, the liquid is one which exhibits the normal force phenomenon described, namely, during rotary shear, as brought about by the application of a rotary stress, it produces a force normal to the described power transmitting surfaces.

The liquid is a viscous one, as required for a strong normal force effect.

An example of a suitable liquid is a 5% by weight solution in mineral oil of polyisobutylene of a viscosity average molecular weight of $1.23 \times 10^6$. The mineral oil has a kinematic viscosity of 108 centistokes at 100° F. and 9.5 centistokes at 210° F., and a molecular weight of 462. This solution exhibits an apparent viscosity ranging from 1,000 down to about 20 poises at 77° F. and shear rates in the range of 1 to 10,000 reciprocal seconds, and an apparent viscosity ranging from 100 down to 4 poises at 167° F. and shear rates in the range of 1 to 10,000 reciprocal seconds. Plots of apparent viscosity versus shear rate at these various temperatures show curves of sigmoid shape, indicating that the liquid is a pseudoplastic type of non-Newtonian material. At shear rates ranging from about 10 to 1,000 reciprocal seconds, and at temperatures of 77 to 167° F., the liquid exhibits a normal force or normal pressure, expressed as lbs. of total thrust, ranging from about 0.2 to about 6.4 lbs. when tested in a modified Ferranti-Shirley cone-plate rheogoniometer having a cone type shearing element of a radius of only 1.58 inches, a cone angle of 21″, and a maximum speed of only about 30 r.p.m. At any fixed temperature, this relationship between normal force and shear rate is a linear one for this liquid. On scale up, the foregoing value of 6.4 lbs. of thrust (measured at 77° F., 30 r.p.m., and 500 reciprocal seconds) would reach a maximum of 64 lbs. on increasing the radius of the shearing element to 5 inches, and if the rotary speed were increased 10 times to 300 r.p.m., the shear rate would increase to 5,000 reciprocal seconds and the thrust, which increases linearly with shear rate, would increase to 640 lbs. It is thus apparent that the liquid is capable of a normal force of substantial value.

Of interest in the foregoing connection is the fact that when the shear zone of the rheogoniometer is filled with the foregoing liquid, i.e., 5% solution of polyisobutylene in mineral oil, the rotary speed of the shearing element varies linearly with the normal force, i.e., the normal force increases with increasing speed of the shearing element. It is also interesting to note that while the shear stress applied to the foregoing liquid, and also other liquids, increases with the shear rate, the normal force increases with shear rate even more rapidly than the shear stress. Thus, at a shear rate of 100 reciprocal seconds, the normal force may be about 10 times greater than the shear stress.

Besides the liquid described, a number of non-Newtonian viscoelastic liquids which exhibit the normal force phenomenon are available and may be chosen from both aqueous and non-aqueous systems. They include solutions of high polymers in non-aqueous solvents, high polymers in liquid form, and solutions of certain soaps dissolved in hydrocarbon solvents. More particularly, the liquids include polyisobutylene in mineral oil, poly(alkyl methacrylates) in mineral oil or in dimethylphthalate, polyisobutylene in decalin or in o-dichlorobenzene, rubber in xylene or in benzene, polystyrene in decalin or in dimethylphthalate, methylcellulose or sodium carboxymethylcellulose in water, aluminum or calcium soaps of fatty or naphthenic acids dissolved in hydrocarbons, calcium acetate dispersions, glue in water, etc.

Desirably these liquids should have an apparent viscosity in the range of about 1 to 1000 poises or more at a shear rate in the range of about 10,000 to 1 reciprocal seconds. They may exhibit a normal force of up to several hundred pounds of thrust, or from a few tenths, or even hundredths, to one or two hundred p.s.i. These are illustrative values.

As described, the liquid is a non-Newtonian one. It may be added that the term "non-Newtonian" may not be precise in some cases, as where a liquid may exhibit both Newtonian and non-Newtonian behavior. On the other hand, the term "viscoelastic" is applicable to all liquids suitable for use in the invention.

The term "liquid" means all fluids other than gases.

It will be understood that the invention is capable of obvious variations without departing from its scope.

In the light of the foregoing description, the following is claimed.

I claim:

1. In a power transmission device comprising a driving member, a driven member axially movable toward and from the driving member, and means intermediate said members for providing a driving connection therebetween, the improvement comprising a rotatable plate adjacent said driving member, a non-rotatable plate spaced from said rotatable plate by a narrow gap, said non-rotatable plate being axially movable toward and from the rotatable plate, a viscoelastic liquid in said gap in contact with adjacent surfaces of said plates, said liquid being characterized, when subjected to a rotary stress, of undergoing rotary shear and exerting a pressure normal to said surface of the non-rotatable plate, means for enabling the driving member to rotate the rotatable plate, said rotatable plate, by rotation thereof, applying a rotary stress to said liquid to cause the latter to undergo rotary shear and to produce said pressure, said pressure being effective against said non-rotatable plate to move the same axially away from said rotatable plate, and means for transmitting said last-mentioned axial movement to said driven member to move the same towards said driving member, thereby bringing said members into driving engagement.

2. The device of claim 1 wherein said plates are co-axially disposed, are substantially parallel, and have adjacent surfaces that are substantially flat.

3. The device of claim 2 wherein said plates are substantially circular.

4. The device of claim 1 wherein the driving member has mounted thereon said means for enabling the driving member to rotate the rotatable plate, whereby the latter rotates with the driving member.

5. The device of claim 1 wherein said liquid not only fills said gap but also immerses said plates.

6. The device of claim 1 wherein said means for transmitting axial movement to the driven member comprises a mechanical linkage system.

7. The device of claim 1 wherein said driving and driven members, and said means intermediate said members for providing a driving connection therebetween, form a friction clutch.

8. The device of claim 1 wherein said driving and driven members, and said means intermediate the members for providing a driving connection therebetween, form a fluid coupling.

9. In a friction clutch comprising a driving member, a driven member normally spaced therefrom, means intermediate said members for providing a frictional driving connection therebetween, means for disengaging said driving connection, and wherein said driven member is mounted on an axially movable shaft and is axially movable therewith, the improvement comprising a rotatable plate adjacent said driving member, means for effecting a driving engagement between said driving member and plate whereby the plate rotates with the driving member, a non-rotatable plate coaxial with and substantially parallel to said rotatable plate and spaced therefrom by a narrow gap, said non-rotatable plate being axially movable toward and from said rotatable plate, a non-Newtonian viscoelastic liquid in said gap in contact with adjacent surfaces of said plates, said liquid being characterized, when subjected to a rotary stress, of undergoing rotary shear and exerting a pressure normal to said surface of the non-rotatable plate, a shaft extending from said non-rotatable plates on the side opposite said gap and being axially movable therewith, lever means operatively connecting said last-mentioned shaft to the shaft of said driven member, said rotatable plate, by rotation thereof, applying a rotary stress to said liquid to cause the latter to undergo rotary shear and to produce said pressure, said pressure being effective against said non-rotatable plate to move the same axially away from said rotatable plate, said last-mentioned axial movement resulting, through said lever means and shafts, in axial movement of the driven member towards said driving member, thereby bringing said members into driving engagement.

10. In a fluid coupling comprising a driving member, a driven member normally spaced therefrom, a fluid power-transmitting agent intermediate said members for providing a driving connection therebetween, and wherein said driven member is mounted on an axially movable shaft and is axially movable therewith, the improvement comprising a rotatable plate adjacent said driving member, means for effecting a driving engagement between said driving member and plate whereby the plate rotates with the driving member, a non-rotatable place coaxial with and substantially parallel to said rotatable plate and spaced therefrom by a narrow gap, said non-rotatable plate being axially movable toward and from said rotatable plate, a non-Newtonian viscoelastic liquid in said gap in contact with adjacent surfaces of said plates, said liquid being characterized, when subjected to a rotary stress, of undergoing rotary shear and exerting a pressure normal to said surface of the non-rotatable plate, a shaft extending from said non-rotatable plate on the side opposite said gap and being axially movable therewith, lever means operatively connecting said last-mentioned shaft to the shaft of said driven member, said rotatable plate, by rotation thereof, applying a rotary stress to said liquid to cause the latter to undergo rotary shear and to produce said pressure, said pressure being effective against said non-rotatable plate to move the same axially away from said rotatable plate, said last-mentioned axial movement resulting, through said lever means and shafts, in axial movement of the driven member towards said driving member, thereby bringing said members into driving engagement.

References Cited

UNITED STATES PATENTS

| | | | |
|---|---|---|---|
| 1,618,644 | 2/1927 | Dickson | 192—105 |
| 3,209,874 | 10/1965 | Foster et al. | 192—58 |

BENJAMIN W. WYCHE III, *Primary Examiner.*